United States Patent [19]
Tsukamoto et al.

[11] Patent Number: 5,813,650
[45] Date of Patent: Sep. 29, 1998

[54] ASEISMIC SUPPORT STRUCTURE

[75] Inventors: Takeshi Tsukamoto, Ohtsu; Hiroshi Suzuki, Ohmihachiman; Akira Suzuki, Ohmihachiman; Katsushi Tanaka, Ohmihachiman, all of Japan

[73] Assignee: International Business Machines Corporation, Armonk, N.Y.

[21] Appl. No.: 725,150

[22] Filed: Oct. 2, 1996

Related U.S. Application Data

[63] Continuation-in-part of Ser. No. 570,789, Dec. 12, 1995.

[30] Foreign Application Priority Data

| Mar. 2, 1995 | [JP] | Japan | 7-042747 |
| Oct. 2, 1995 | [JP] | Japan | 7-254826 |
| Feb. 19, 1996 | [JP] | Japan | 8-030211 |

[51] Int. Cl.⁶ ............................................. E04H 9/02
[52] U.S. Cl. ............................... 248/638; 52/167.8
[58] Field of Search .................................. 248/638, 158, 248/161, 276.1, 278.1, 919, 921, 634, 618; 52/167.3, 167.8, 263

[56] References Cited

U.S. PATENT DOCUMENTS

| 3,606,704 | 9/1971 | Denton | 52/167.8 |
| 3,794,277 | 2/1974 | Smedley et al. | 52/167.8 X |
| 5,477,649 | 12/1995 | Bessert | 52/263 |

*Primary Examiner*—Ramon O. Ramirez
*Assistant Examiner*—Long Dinh Phan
*Attorney, Agent, or Firm*—Anthony N. Magistrale

[57] ABSTRACT

Disclosed is an aseismic support structure having one end secured to a fixed floor and another end connected to a subject structure placed on a floating floor. The aseismic support structure includes a toggle bar, an attachment section and a mounting section. The toggle bar has a universal joint at each end and is adjustable in its length to have a predetermined length. The universal joints are rotatable around axes in the horizontal and vertical directions, respectively. The attachment section is connected to the toggle bar through one of the universal joints, and has at another end a third universal joint comprising a vertical rotation section. A cantilever extends substantially parallel to the fixed floor, is connected to the attachment section by the third universal joint at one end and has a fourth universal joint at another end. The mounting section is connected to the cantilever by the fourth universal joint and secures the equipment.

6 Claims, 5 Drawing Sheets

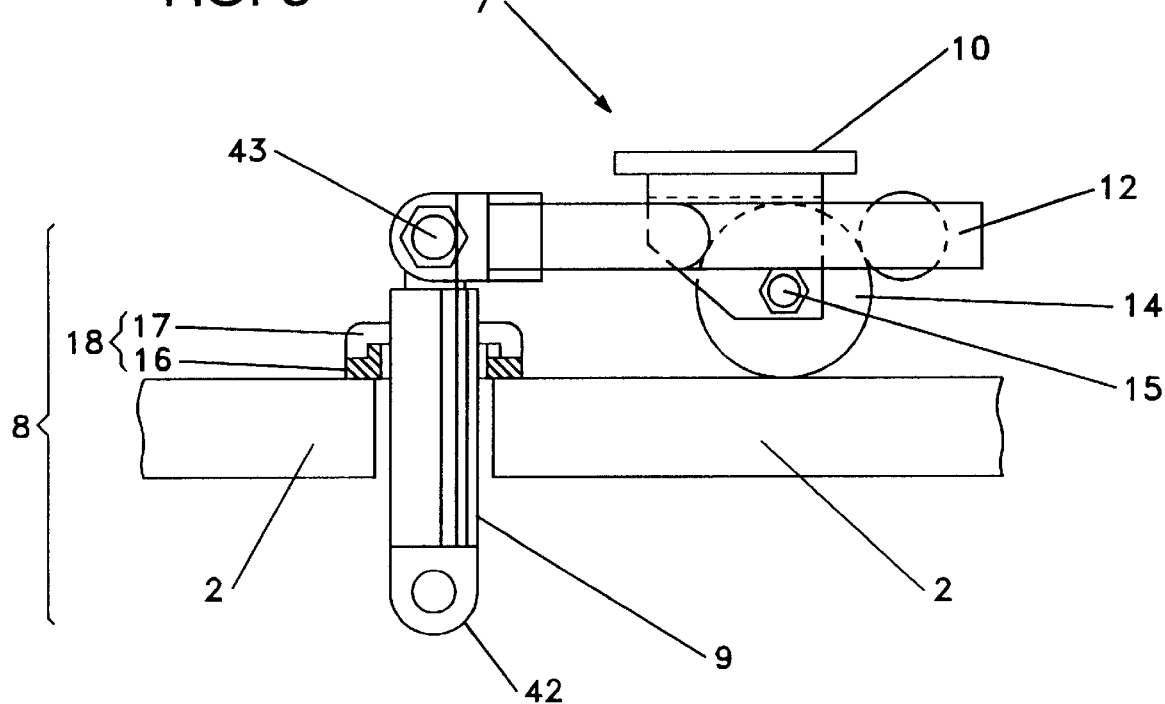
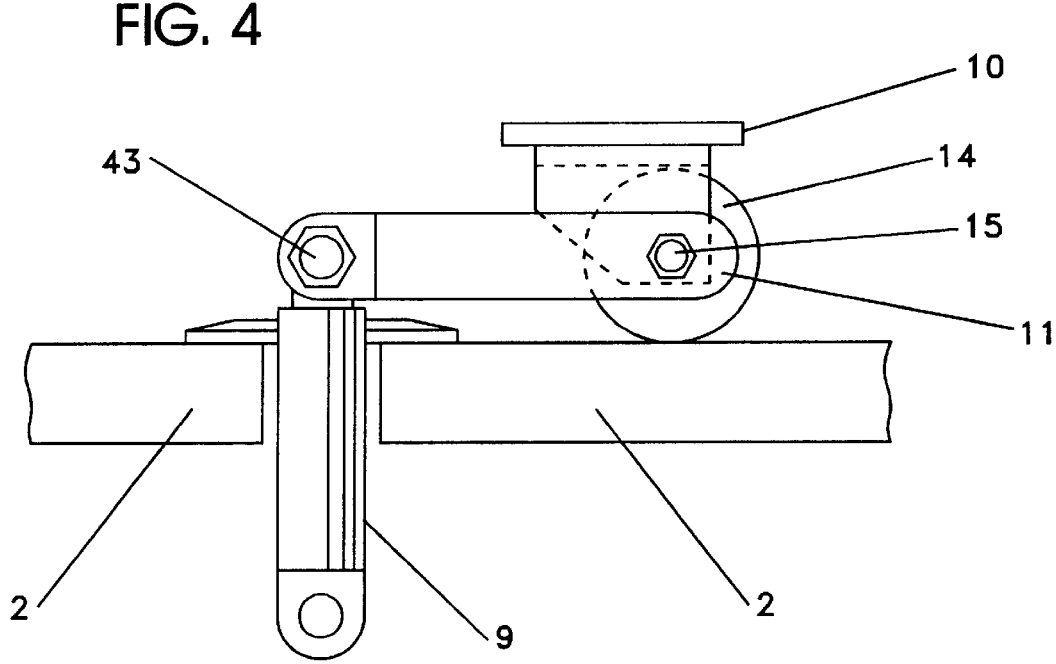

ASEISMIC SUPPORT STRUCTURE

This is a continuation-in-part of U.S. parent application Ser. No. 08/570,789 filed Dec. 12, 1995 which claims foreign priority of Japanese counterpart application 7-042747 filed May 2, 1995. This continuation-in-part also claims foreign priority of Japanese counterpart application 7-254826 filed Oct. 2, 1995; and Japanese counterpart application 8-30211 filed Feb. 2, 1996.

BACKGROUND OF THE INVENTION

1. Field of the Invention

The present invention relates generally to aseismic support structures for supporting another structure on a fixed floor and more particularly, to an aseismic support structure which prevents equipment which is sensitive to vibration (such as computer equipment) from being damaged, losing data or malfunctioning due to an earthquake.

2. Description of Related Art

There are a wide variety of structures that are presently utilized for industrial applications such as manufacturing machines, home electric appliances, and transport equipment. Some of them are particularly sensitive to vibrations due to an earthquake. It is the primary object of an earthquake resistant support structure (hereinafter called the "aseismic support structure") to prevent such structure from falling down when an earthquake occurs. In addition, devices which are sensitive to the vibration of an earthquake such as electronic equipment, computers, instruments (hereinafter called the "equipment") should be considered when designing an aseismic support structure since earthquakes can cause such equipment to lose data, malfunction or be destroyed. Severer requirements are imposed on equipment which observes earthquake behavior and immediately calculates data based on the results of the observation. To this end, it is necessary to secure such equipment on a floor or the like by a structure which is different from a normal structure and which is an aseismic structure or a structure having high earthquake resistance.

A problem first encountered when an earthquake occurs is that the equipment moves or falls down. If equipment moves, attached cables or the like may be damaged or contact other equipment so that the possibility of malfunction is further increased. If the equipment falls down, it may be physically damaged, physically damage other equipment or injure an operator. It is also very important that the vibrations caused by an earthquake not impact the interior of such equipment from the floor. For example, vibrations can cause stress to occur in components in the equipment, leading to destruction of a package, error or loss of data.

Generally, because a number of cables are attached to the equipment, the floor is constructed as a dual structure for large equipment. In other words, a free access floor is installed with a predetermined spacing over a fixed floor (slab) constituting the bottom so that free wiring is assured by utilizing the spacing.

There have been several support structures and approaches designed for applications such as large equipment installed on dual-structured floors. The simplest approach is to mount casters on the equipment and place it on the free access floor. Typically, in this approach, the casters are normally fixed because problems can occur if the equipment moves during normal use. If an earthquake occurs and acceleration at a predetermined magnitude or more acts on the equipment, the casters are released for free movement so that the movement of equipment with the casters absorbs the energy of the earthquake. This approach is the simplest measure against an earthquake because only small parts (casters) are mounted on the bottom of the equipment and it can be conveniently relocated. However, it has earthquake resistance as low as 0.4 G and cannot provide resistance for large earthquakes which cause serious problems with the equipment. In addition, it still has problems of generation of stress on cables due to movement of the equipment and falling-down of the equipment so that it is not a suitable approach as an aseismic support method. An improved method includes mounting a pad on the caster and securing the equipment on the free access floor with suction cups. However, they are not essentially appropriate in view of earthquake resistance.

Another approach for improving earthquake resistance includes an approach directly securing the equipment on the fixed floor (slab) or the free access floor with means such as bolts. The former is also called a direct support type, while the latter is called an indirect support type. The direct support type has an earthquake resistance which can withstand 1 G of acceleration or more and, accordingly, has an advantage that the equipment does not move or fall down. However, because once the equipment is secured, it becomes difficult to be moved, this approach requires a long term perspective in the installation layout for the equipment, and high costs are associated with installation. Moreover, as the earthquake's energy is directly transmitted through the fixed floor, it is an approach which is susceptible to malfunction. There is an improved structure for such aspect in which a resilient vibration absorber is disposed between the securing means and the equipment (PUPA 3-11699). However, it still fails to overcome problems such as workability and relocation of the equipment. The indirect support type imposes similar problems. In addition, aseismic construction of the free access floor is a prerequisite in employing such an approach which results in disproportionately high costs relative to the total cost.

A vibration isolation floor system that has been developed to solve some of the disadvantages of the above-described structures and approaches is disclosed in PUPA 3-235873. This vibration isolation floor system is a system wherein the entire floor of a room in which the equipment including a computer is installed is supported by vibration absorption means such as springs so as not to directly transmit the earthquake force to the equipment. An example is shown in FIG. 5. In the figure, there is an intermediate support 20 constrained by springs 101 and 103 for x and y directions between a fixed floor 1 and a free access floor 2. The free access floor 2 is connected to the intermediate support 20 through the vertical spring 101 and a damper 102 so that the vibration of an earthquake is not directly transmitted to the free access floor. In addition, as the fixed floor 1 is joined to the intermediate support 20 through the horizontal spring 103 and a damper 102, the intermediate support 20 also does not significantly move in the horizontal direction so that the position of the equipment 100 is stabilized.

This system can reduce the impact of an earthquake on the equipment (reduce the possibility of malfunction and data error) in that it does not directly transmit the earthquake force to the equipment on the free access floor. In addition, because the equipment can be simply secured on the free access floor, there is little possibility of the equipment moving or falling-down from the synergism with the earthquake resistance of the free access floor. Moreover, since it is sufficient to secure the equipment by temporary means such as suction cups, the equipment can be moved in a relatively free manner. However, provision of a room with such a structure for the equipment causes a significant problem in view of the associated expenses, and failure tends to occur in the air-conditioning under the floor because of the complicated underfloor structure. Moreover, it is well known that such a system cannot be applied to equipment already installed because it requires modifications to the entire room.

OBJECTS OF THE INVENTION

It is one object of the present invention to provide an aseismic support structure which prevents the equipment from falling down or moving when an earthquake occurs. In addition, it is another object to provide an aseismic support structure which has an earthquake resistance of 1 G or more and which can withstand the impact of an earthquake on the equipment at the minimum level.

It is another object of the present invention to provide an aseismic support structure and system which does not require any modifications to a room in which the equipment is installed, is easily applicable to existing equipment, eliminates the complexity of the underfloor structure and does not cause any harm in relocation of the equipment.

SUMMARY OF THE INVENTION

The present invention is directed to an aseismic support structure which secures equipment by fixing one end to a fixed floor and another end to subject equipment to be installed on a free access floor. The aseismic support structure of the present invention includes a toggle bar with a predetermined length and extendable, preferably in the longitudinal direction. The toggle bar has a universal joint at each end and the universal joint allows the toggle bar to uniformly incline at any orientation parallel to the fixed floor. An attachment mechanism is secured to the toggle bar at one end through one of the universal joints, having at another end a third universal joint provided with an axis of rotation at least parallel to the floor surface, and constrained for its position to the floating floor. A cantilever is connected to the attachment mechanism by the third universal joint at one end and has a fourth universal joint at another end. The cantilever extends substantially parallel to the fixed floor. A mounting mechanism is connected to the cantilever through the fourth universal joint for securing the subject equipment. All of the universal joints typically include a horizontal rotation section freely rotatable around an axis in a direction perpendicular to the fixed floor surface (hereinafter called the "z direction") and a vertical rotation section freely rotatable around an axis in a direction horizontal to the fixed floor surface (hereinafter called the "x direction").

BRIEF DESCRIPTION OF THE DRAWINGS

FIG. 3 is a schematic view showing the attachment section and the mounting section of the aseismic support structure according to the present invention.

FIG. 4 is an another embodiment of the attachment section and the mounting section of an aseismic support structure according to the present invention.

DETAILED DESCRIPTION OF THE INVENTION

Figure 1:
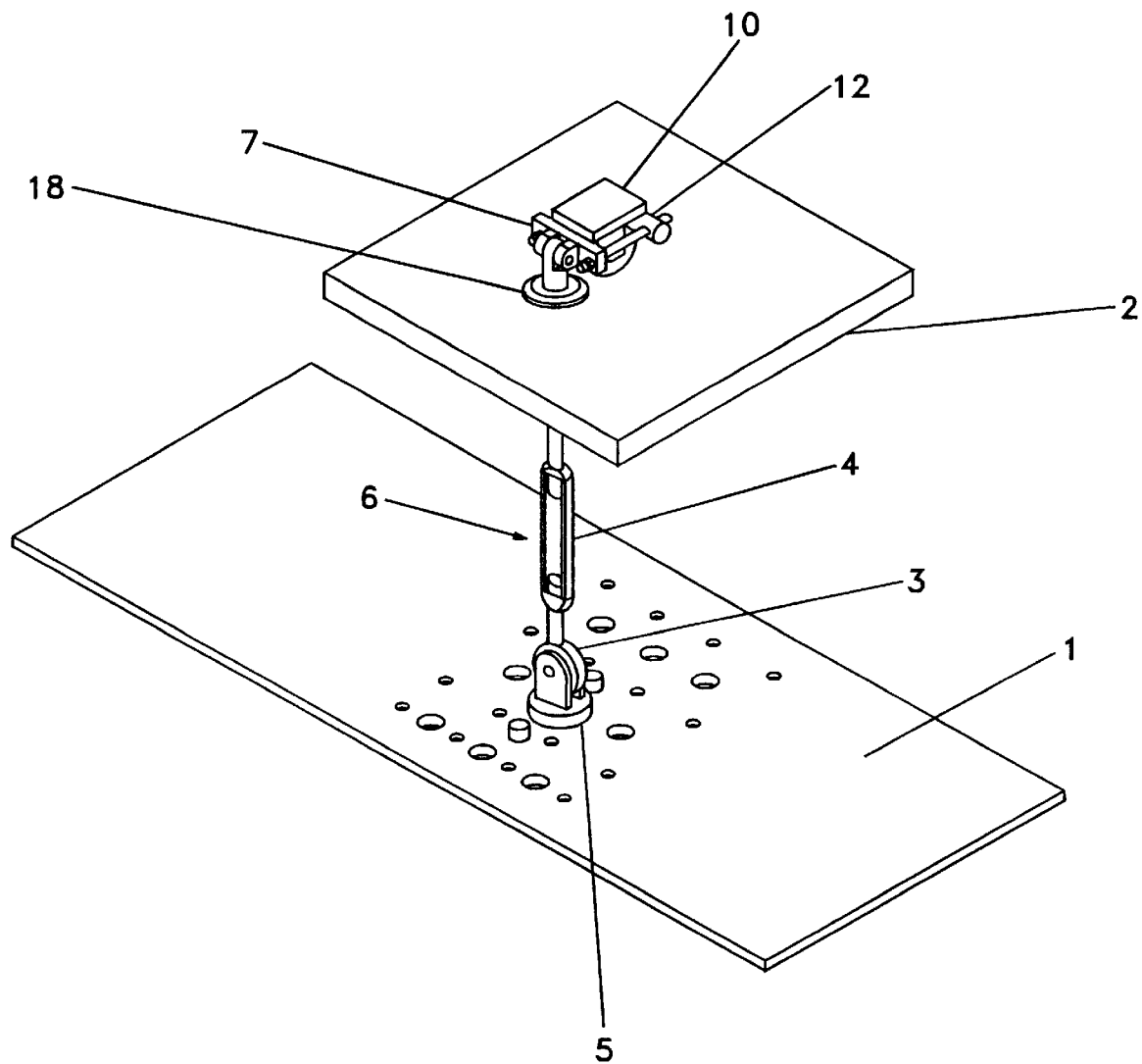
FIG. 1 is a perspective view of an aseismic support structure according to the present invention.

FIG. 1 shows an embodiment of an aseismic support structure according to the present invention. The aseismic support structure is secured to a fixed floor 1 at one end with means such as bolts. In addition, it is connected to equipment installed on a free access floor 2 extending therethrough with mounting means 12. This provides a function for securing the equipment on the fixed floor 1. A caster 10 shown in FIG. 1 is usually mounted on the equipment and does not constitute a part of the present invention. Although the equipment is integral to the caster 10, it is not shown in the figure.

Figure 2:
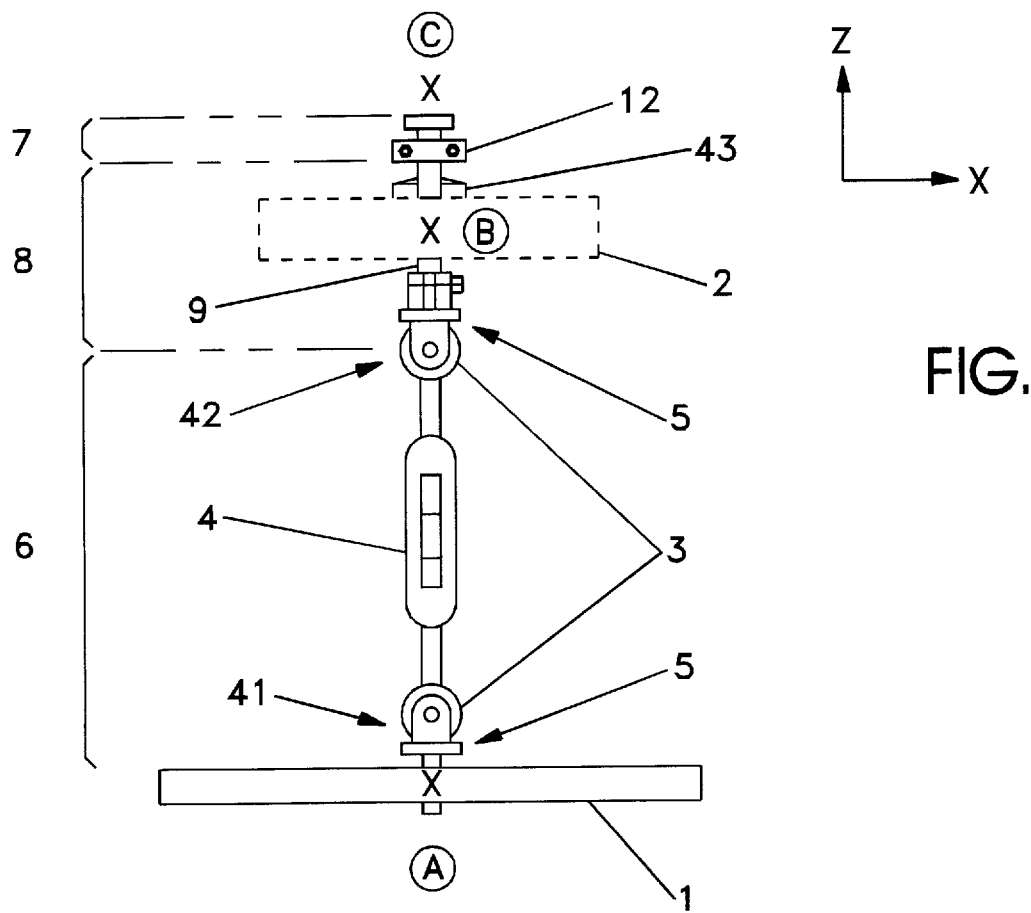
FIG. 2 is a side schematic view of the aseismic support structure according to the present invention.
Figure 5:
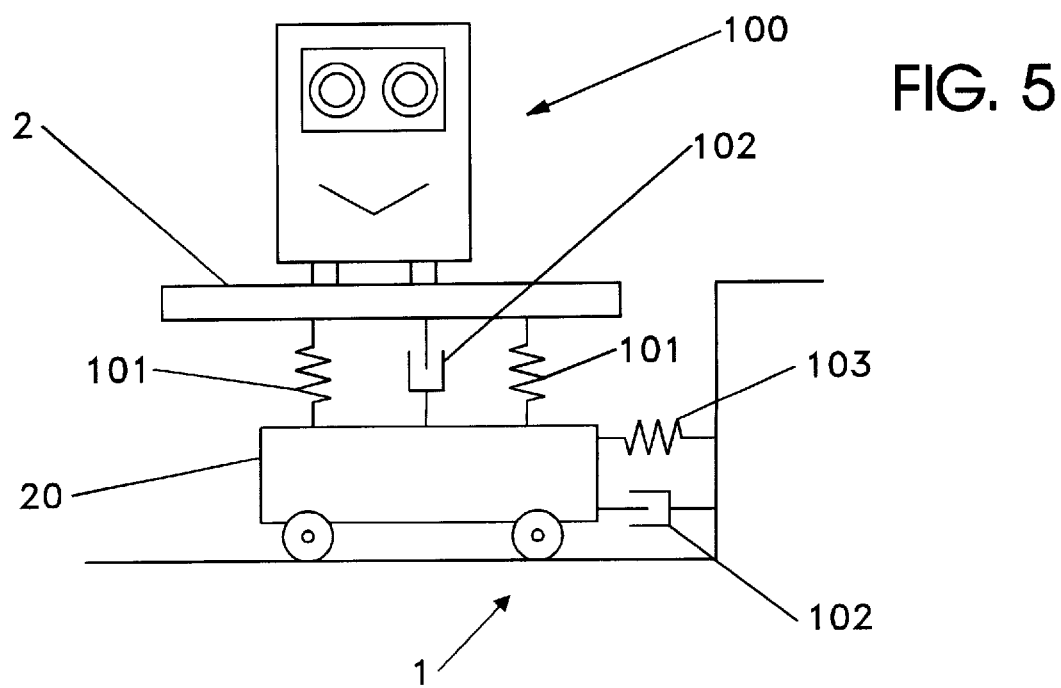
FIG. 5 is a schematic view of a prior art vibration insulation floor system.

FIG. 2 shows a schematic view of the aseismic support structure of FIG. 1 viewed from one side. The aseismic support structure comprises a toggle bar section 6 which includes a toggle bar 4, an attachment section 8 extending through the free access floor 2, and a mounting section 7 attaining connection with the equipment.

Referring to FIGS. 1 and 2, the toggle bar section 6 includes the toggle bar 4, and universal joints 41 and 42 provided at each end of the toggle bar 4. The toggle bar 4 is so constructed that a steel member is threaded in at each end of its frame-like portion, allowing adjustment of its entire length. The toggle bar 4 may have a structure which incorporates a resilient member such as a spring, as required, to provide a predetermined spring constant in the longitudinal direction. In such a case, a suitable spring constant ranges from 15 to 30 kgf/mm. The suitable spring constant is also a design factor depending on the weight of the subject equipment to be supported and how much earthquake resistance is required. The spring constant may be adjusted by the modulus of elasticity and the sectional shape of materials constituting the toggle bar 4.

The universal joints 41 and 42 are connected to each end of the toggle bar 4. In this embodiment, the universal joint is designed to be freely rotatable in the horizontal and the vertical directions. The horizontal rotation is provided by a horizontal rotation section 5 rotating around an axis perpendicular to the fixed floor 1, while the vertical rotation is provided by a vertical rotation section 3 integral with the horizontal rotation section and rotating around an axis in a direction parallel to the fixed floor 1. For the horizontal and vertical rotation sections, a combination of universal joints or flexible joints are employed for allowing free rotation without resistance. It should be understood that the structure of universal joints 41 and 42 should not be limited to the ones shown in FIGS. 1 and 2. It is sufficient that the universal joint has a structure which allows uniform inclination of the toggle bar in any directions horizontal to the fixed floor. The present invention may be implemented by using a mortar-shaped structure similar to, for example, a human shoulder joint.

As shown in FIG. 3, the attachment section 8 mainly consists of a shaft 9 with a predetermined length. The shaft 9 is connected to the toggle bar 4 at one end through the universal joint 42. The other end of the shaft 9 is connected to the mounting means 7 through the universal joint 43. When the aseismic support structure secures the equipment, the attachment section 8 is at a location where it extends through the free access floor 2, and its position in the direction parallel to the floor surface is constrained. The shaft 9 preferably has high rigidity, and is not easily deformed by the vibration of an earthquake. Although a considerable space is provided between the shaft 9 and the free access floor 2 in FIG. 3, the space is not necessarily required. However, some degree of freedom is necessary not to prevent circumferential rotation of the shaft 9. A filler 18 is fixed on the shaft 9 in such a manner that it just slightly contacts the free access floor. The filler 18 consists of a steel section 17 and a rubber section 16. The rubber section has a high vibration insulation capability, and serves to absorb the vibration of an earthquake. The rubber section 16 preferably consists of a material with good weather resistance such as chloroprene or butyl rubber.

The mounting section 7 serves to connect the aseismic support structure to the equipment. The mounting section 7 is connected to the shaft 9 through the universal joint 43. The universal joint 43 need not have a horizontal rotation section as in other universal joints 41 and 42. A main component of the mounting section 7 is a mounting mechanism 12. In FIGS. 1 and 3, the mounting mechanism 12 presents a frame shape into which the caster 10 mounted on the equipment is fitted. Other approaches can be used for mounting the equipment on the mounting section 7. For example, as shown in FIG. 4, a shaft 15 of a wheel 14 of the caster 10 may be directly inserted into the mounting mechanism 12. Requirements for the mounting section 7 include firmly securing the wheel 14 of the caster on the free access floor 2.

The operation of the aseismic support structure according to the present invention will now be described. For the purpose of this description, the longitudinal direction of the toggle bar 4 is the z direction shown in FIG. 2, a direction perpendicular to it and also perpendicular to the surface of paper sheet is the y direction, and the remaining direction is the x direction. An earthquake is comprised of three-dimensional vibrations. In other words, it is a three-dimensional variation of a distance between two points. Now, if it is assumed, as shown in FIG. 2, that a connection point between the fixed floor and the equipment is point A, a contact point between the free access floor and the aseismic support structure is point B, and a location where the equipment is mounted is point C, the relative positional relationship between points A and B varies in all of x, y and z directions with considerable acceleration at occurrence of an earthquake. The aseismic support structure is necessary to allow such variation in the positional relationship while absorbing its effects.

The positional variation of the toggle bar between points A and B in the longitudinal direction (mainly, in the z direction) is absorbed by the elasticity provided for the toggle bar. Simultaneously, vibration which may be defined as continuous fine variations of position can be absorbed by setting the spring constant of the toggle bar to a suitable value. Even if the spring is not incorporated in the toggle bar 4 so that the predetermined modulus of elasticity is not provided, or when the amount of displacement by an earthquake is small, the positional variation in the z direction can be absorbed by, for example, the deformation of the rubber section 17 in the filler 18 or the play in the universal joint. The positional variation in x and y directions can be absorbed by the synergism of the horizontal and vertical rotations of the universal joints 41 and 42. That is, the horizontal rotation section instantaneously rotates in the direction in which the vibration occurs so that the toggle bar 4 can incline around the axis of the vertical rotation section, and thus causes the direction to which the toggle bar 4 can incline to match the direction of vibration by the earthquake. This principle allows it to follow up the vibration by the earthquake.

For vibration in the x direction, for example, as shown in FIG. 2, the toggle bar 4 can incline to the x direction, and can follow up the vibration of an earthquake because the toggle bar can incline without rotation of the horizontal rotation section. If a component in the y direction is added to the vibration, the horizontal rotation section of the universal joint rotates by that amount so that the toggle bar can incline in the direction of vibration. If the follow-up ability is not good for the rotation in the horizontal direction, the toggle bar 4 is subject to a bending stress in the direction to which the toggle bar cannot incline, and deformed so that its function would be lost. Accordingly, to improve the follow-up capability of the horizontal rotation section, measures are taken such that the joint section is constituted by a combination of flexible joints or universal joints.

It is desirable that the positional relationship between points B and C is constant. The shaft 9 has a property close to a rigid body which is not easily deformed. In other words, the shaft 9 always stands vertical with respect to the free access floor. Then, it only allows according to vertical vibration of an earthquake the universal joint 43 to rotate around the horizontal axis, and the caster to bounce on the free access floor. The horizontal rotation of the mounting section 7 is provided by the horizontal rotation section of the universal joint 42. However, there is no problem in providing another horizontal rotation section for the universal joint 43.

Thus, the aseismic support structure according to the present invention provides can absorb three dimensional vibrations in x, y and z directions by the toggle bar section 6, as well as the universal joints 41 and 42 connected thereto.

Figure 6:
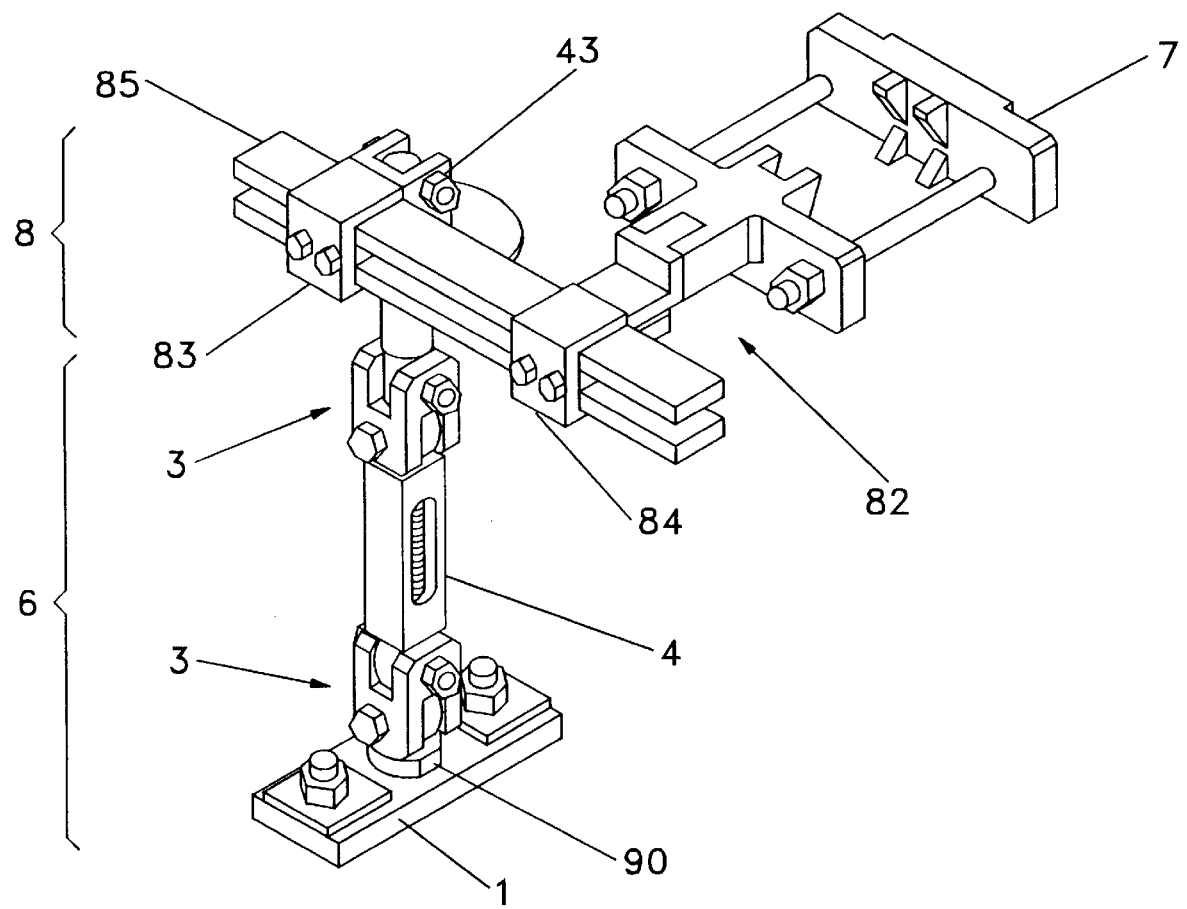
FIG. 6 is a perspective view of another embodiment of an aseismic support structure according to the present invention.

FIG. 6 shows another embodiment of an aseismic support structure according to the present invention. In this embodiment, a cantilever 85 is substantially parallel to the fixed floor between the attachment means section 8 and the mounting section 7 of the aseismic support structure according to the first embodiment. The cantilever 85 serves to offset the horizontal position of the mounting section 7 from a position just above a connecting section 90 with the fixed floor 1. In this embodiment, effects provided by the toggle bar section 6 and the attachment means section 8 are same as those in the first embodiment. The attachment means section 8 is connected to one end of the cantilever 85 by the universal joint 43. The other end of the cantilever 85 is connected to the mounting section 7 by another joint 82. The universal joints 43 and 82 are connected to the cantilever 85 through suitable fixtures 83 and 84.

Figure 7:
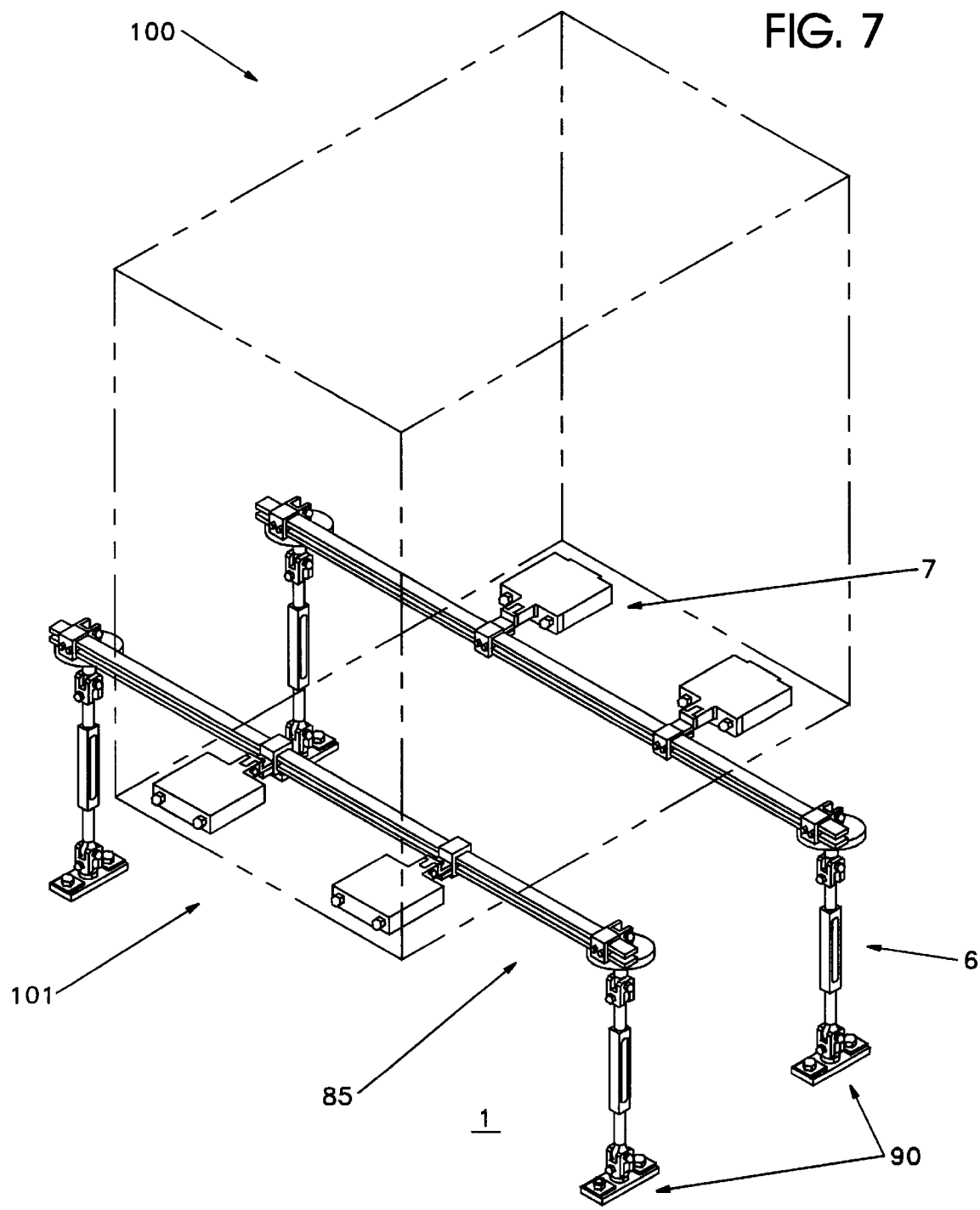
FIG. 7 a perspective view showing equipment secured to a fixed floor by the aseismic support structure of FIG. 6.

FIG. 7 is a schematic view showing equipment 100 secured on the fixed floor by using the second embodiment. The equipment 100 is connected to the aseismic support structure through the mounting section 7. The aseismic support structure is connected to the fixed floor 1 at an end 90 different from the end where the mounting means section 7 exists. This embodiment is characterized by the mounting means section 7 not being positioned just above a connection point 90 connecting the toggle bar section 6 with the fixed floor 1. The cantilever 85 is disposed between the mounting means section 7 and the toggle bar section 6, and extends substantially parallel to the fixed floor. The reason why the mounting means section 7 needs to be offset from a position just above the connection point 90 lies in, for example, that wiring may be crowded at a position 101 just below the equipment 100 so that the toggle bar section 6 may not necessarily be positioned just below the equipment 100. That is, the cantilever 85 provides an advantage that it prevents the connection point 90 from being positioned just below the equipment 100 so that the aseismic support structure can be installed regardless of the conditions just below the equipment 100.

The cantilever 85 should have sufficient rigidity such that it is not deformed by the weight of the equipment and shock from an earthquake. In addition, the cantilever 85 is also not limited to a specific length as long as it satisfies the required rigidity. Such rigidity and length are merely matters of design.

The aseismic support structure according to the present invention can secure the equipment on the fixed floor. Accordingly, it has advantages of the direct support system preventing falling-down and movement, and also has a feature not to directly transmit the vibration of an earthquake to the equipment by providing elasticity for the toggle bar or employing a vibration absorber for the interposed filler. Thus, it can attain the target of earthquake resistance of 1 G or more.

Furthermore, the aseismic support structure according to the present invention can provide earthquake resistance for the equipment only by connecting one end to a part of equipment placed on the free access floor and another end to the fixed floor. That is, it can very easily attain the aseismic effect in view that it does not require modification work for the room as in the conventional vibration isolation system in attaining the earthquake resistance. Furthermore, since it can be relatively easily removed, it can easily be relocated with the equipment and can be easily installed on the existing equipment.

In addition, the aseismic support structure of the present invention can be installed regardless of the conditions just below the equipment by providing between the toggle bar section and the mounting section a cantilever 85 extending substantially parallel to the fixed floor as disclosed in the embodiment of FIGS. 6 and 7. Accordingly, measures against an earthquake can be further easily provided while maintaining the existing installation conditions.

The description provided above for the present invention assumes a case where electronic equipment such as a computer is installed on the aseismic support structure. However, manufacturing facilities such as a chemical plant requires similar considerations. Since chemical manufacturing facilities can cause a serious impact not only to humans but also to the surrounding environment if they are destroyed, it is necessary to prevent such a situation whenever possible. Accordingly, the installation of the aseismic support structure according to the present invention covers all equipment requiring measures against an earthquake and particularly those installed on a floating floor. It is not limited to electronic equipment such as a computer as disclosed in relation to the embodiments.

While the invention has been particularly shown and described with respect to preferred embodiments thereof, it should be understood by those skilled in the art that the foregoing and other changes in form and detail may be made therein without departing from the spirit and scope of the invention as defined in the appended claims.

What is claimed is:

1. An aseismic support structure having a first end secured on a fixed floor and a second end connected to a subject structure placed on a floating floor, said aseismic support structure comprising:

a toggle bar having a first universal joint at its first end and a second universal joint at its second end, said first and second universal joints allowing the toggle bar to rotate horizontally around an axis perpendicular to said fixed floor and to rotate vertically around an axis parallel to said fixed floor;

an attachment section connected to said first universal joint by said second universal joint at one end, and having a third universal joint at another end, said attachment section position horizontal to said fixed floor and being constrained to said floating floor;

a cantilever connected to said attachment section by said third universal joint at one end, and having a fourth universal joint at another end, said cantilever extending substantially parallel to said fixed floor; and a mounting section connected to said cantilever through said fourth universal joint, said subject structure being secured on said mounting section.

2. An aseismic support structure according to claim 1, wherein said toggle bar has a spring constant of 15–30 kgf/mm.

3. An aseismic support structure according to claim 1, wherein said toggle bar comprises a mechanism for adjusting its length.

4. An aseismic support structure according to claim 1, wherein said first and second universal joints comprise a horizontal rotation section freely rotatable around an axis in a direction perpendicular to said fixed floor surface and a vertical rotation section freely rotatable around an axis in one direction horizontal to said fixed floor surface.

5. An aseismic support structure according to claim 1, wherein said first universal joint is directly secured on said fixed floor.

6. An aseismic support structure according to claim 1, wherein said fourth universal joint is not positioned just above said first end by said cantilever.

\* \* \* \* \*